United States Patent [19]

Hammelmann

[11] 3,843,061

[45] Oct. 22, 1974

[54] APPARATUS FOR SEPARATING RUBBER FROM EMBEDDED REINFORCEMENTS

[76] Inventor: Paul Hammelmann, 474 Oelde/Westf., Zum Sundern 17, Germany

[22] Filed: Aug. 22, 1972

[21] Appl. No.: 282,627

[30] Foreign Application Priority Data
Aug. 27, 1971  Germany............................ 2142979

[52] U.S. Cl. .................................................. 241/38
[51] Int. Cl. ............................................ B02c 19/00
[58] Field of Search............................ 241/1, 38, 39

[56] References Cited
UNITED STATES PATENTS
3,326,607   6/1967   Book................................ 241/39 X Primary Examiner—Granville Y. Custer, Jr.
Attorney, Agent, or Firm—Michael S. Striker

[57] ABSTRACT

One or more nozzles of the type which ejects liquid in sprays at a speed of at least 250 m/sec. are arranged to eject sprays of liquid at an angle of 90° with reference to a workpiece. A receptacle is provided for receiving the rubber which is shredded off the workpiece by the impingement of these sprays of liquid, and an arrangement for effecting relative movement of the workpiece and the nozzles is also provided.

10 Claims, 4 Drawing Figures

APPARATUS FOR SEPARATING RUBBER FROM EMBEDDED REINFORCEMENTS

BACKGROUND OF THE INVENTION

The present invention relates generally to the separation of rubber from embedded reinforcements, and more particularly to an apparatus for effecting such separation. The apparatus according to the present invention is particularly but not exclusively suitable for separating vehicle tire rubber from embedded tire reinforcements.

A very particular problem encountered in the handling of refuse has arisen with the increasing popularity of steel belted vehicle tires. Evidently, these tires cannot simply be burned because the steel belts cannot be combusted. On the other hand, the tires cannot be readily chopped, comminuted or otherwise reduced in size, precisely because the embedded steel belts prevent this, except at unacceptable expense and difficulty.

Attempts have been made to arrive at an approach which would facilitate the processing of discarded steel belted vehicle tires in such a manner as to make it easier to dispose of them. Such attempts have involved the proposal to freeze the tires, in order to make the tire material, including the steel belts, brittle, and thereupon to mechanically reduce the tire in size, that is to subject it to mechanical comminution, chopping or the like. The very description of these attempts indicates their relative complexity which is, quite evidently, unacceptable in the context of modern high-volume refuse disposal.

Accordingly, it is a general object of the present invention to overcome the disadvantages of the prior art.

More particularly it is an object of the present invention to provide an improved apparatus which overcomes those disadvantages.

Still more particularly it is an object of the present invention to provide an apparatus capable not only of separating the rubber from the embedded reinforcements, but also to reduce the rubber to particle size during the separation.

Another object of the invention is to provide such an apparatus which can operate at high speeds and with great reliability.

In pursuance of these objects, and of others which will become apparent hereafter, one feature of the invention resides in an apparatus for separating rubber, particularly vehicle tire rubber, from embedded reinforcements, which apparatus briefly stated comprises at least one nozzle for ejecting a spray of high-pressure liquid against a workpiece. Support means is provided for supporting at least a portion of a vehicle tire opposite the nozzle for impingement of the spray so that the latter can effect separation of the rubber from the embedded reinforcements and at the same time reduce the rubber to rubber particles. Collecting means are provided for collecting the rubber particles, and moving means effects relative movement of the nozzle and support means.

Advantageously, the nozzle arrangement is such that the liquid under pressure, usually water, is ejected from the nozzle or nozzles of which there may of course be several provided, with a speed of at least 250 m/sec.

The many water particles which impinge at high speed upon the rubber material dislodge particles of rubber so that not only is the rubber removed from the embedded reinforcement, that is the steel belts or the like, but the rubber is removed in form of rubber particles which means that the rubber is at the same time being reduced to a readily manageable state and size.

The rubber particles are carried off with the run-off of the water, entering collecting means in form of one or more receptacles wherein they are separated from the water. The latter can advantageously be returned to the nozzles and the rubber particles can be recycled, that is they can be reused in the manufacture of new tires. Similarly, the steel belts which have been freed from the rubber can again either be reused or else can be melted down for raw material.

It is advantageous to deform a tire, before it is subjected to the action of the water spray, so that it constitutes an endless band and to train it about two parallel spaced rotatable rollers. One of these is configurated as a tension roller to make it possible for the arrangement to accept tires of different diameters, and at least one of the rollers is positively driven and is preferably provided with spreading arrangements so that the tire can be spread to a flat condition in transverse direction, and moved past the nozzle at a certain unvarying distance. The spreading arrangements serve to spread the tire transversely to the circumferential direction thereof so that essentially planar —rather than curved— tire surfaces can be juxtaposed with the nozzle.

It is further advantageous that the sprays of ejected water impinge upon the material to be pulverized, that is upon the workpiece, at an angle of substantially 90° in order to fully utilize their kinetic energy.

The novel feature which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
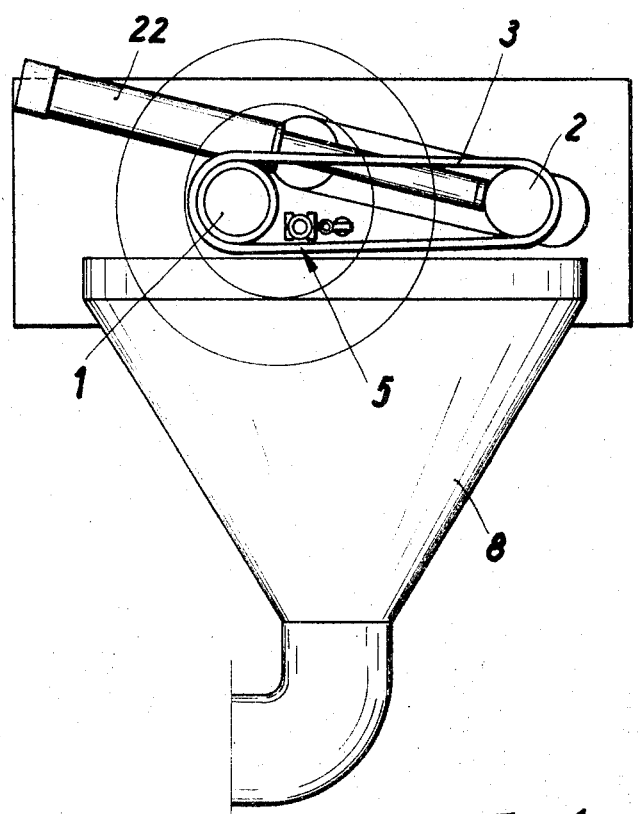
FIG. 1 is a somewhat diagrammatic side-elevational view of an apparatus according to the present invention.
Figure 2:
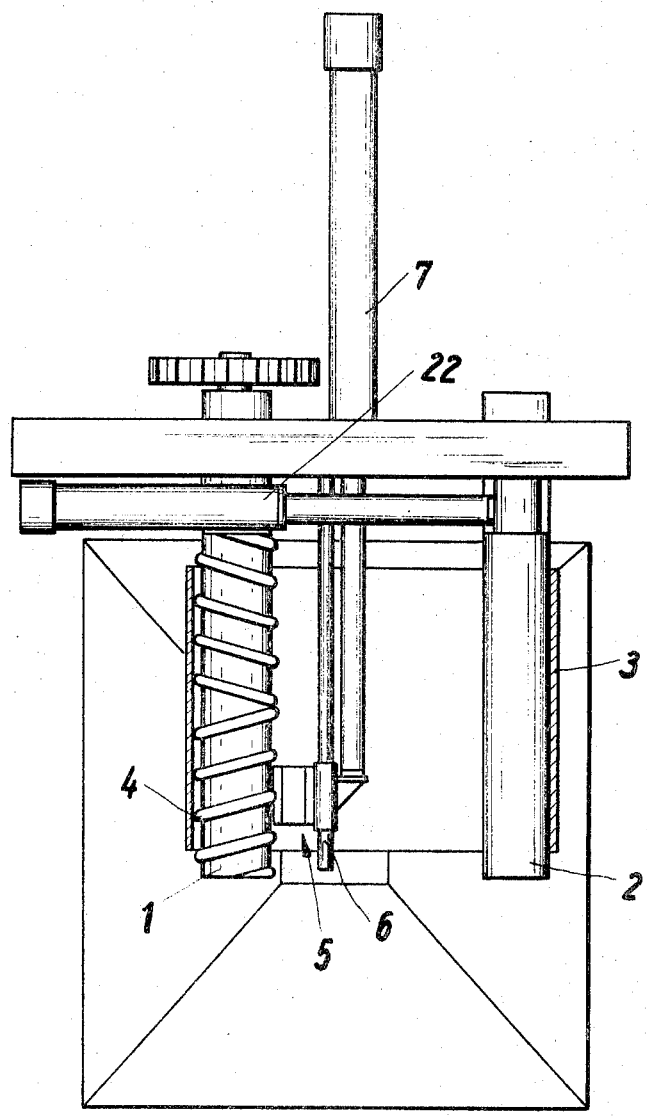
FIG. 2 is a top-plane view of FIG. 1.

Discussing the drawing in detail it will be seen that reference numeral 1 identifies a positively driven roller which is associated at a predetermined distance with a tension roller 2. Reference numeral 3 identifies a workpiece, in form of a vehicle tire which has been deformed to constitute an endless band and has been trained about the rollers 1 and 2. Spreading devices 4 are provided on the roller 1 and serve to spread the tire 3 transversely of its circumferential direction in order to assure that it has essentially planar surfaces rather than being curved in direction transversely to its circumference. Reference numeral 22 identifies a piston and cylinder unit which acts upon the roller 2, so that the latter can be moved towards and away from the roller 1 to stretch the tire 3, making it possible for the apparatus to accept tires of different diameters.

A spray arrangement 5 is provided within the confines of the tire 3 and intermediate the rollers 1 and 2. It is fed with water under pressure and in the illustrated embodiment has a single nozzle whose construction will be discussed in further detail with reference to FIGS. 3 and 4. Of course, more than one nozzle could be provided. In the illustrated embodiment the nozzle extends over a portion of the width of the tire or band 3 and the nozzle and its mounting arrangement are slidably mounted on a guide 6 and can be moved to and fro by means of a hydraulically operated piston and cylinder unit 7.

On the side of the tire 3 which is opposite the spraying device 5 there is provided a receptacle 8 into which the water and the severed rubber particles can enter.

Figure 3:
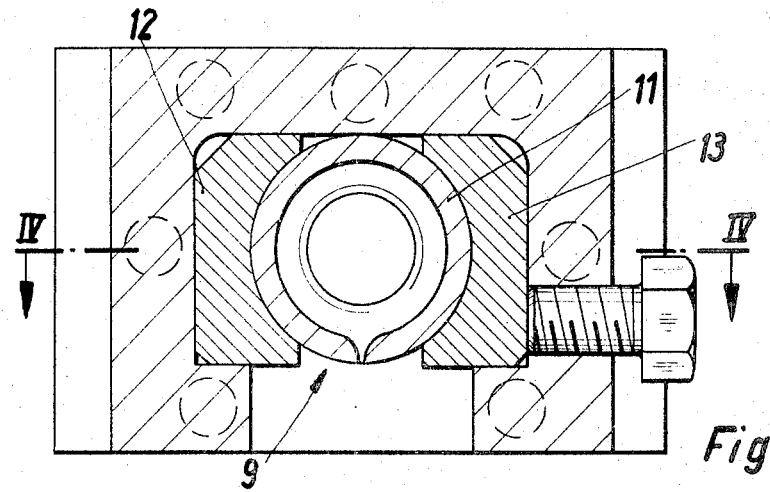
FIG. 3 is a cross-sectional view showing the nozzle and the mounting therefor as employed in the embodiment of FIGS. 1 and 2.
Figure 4:
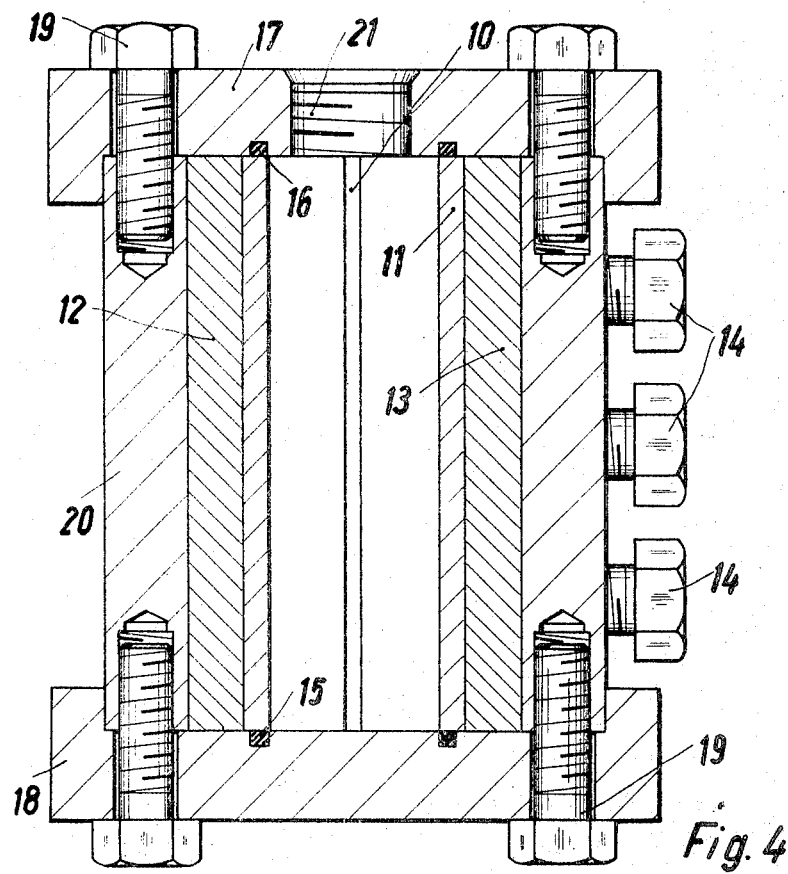
FIG. 4 is a section taken on line IV—IV of FIG. 3.

Coming to FIGS. 3 and 4 it will be seen that in the exemplary embodiment illustrated the nozzle is designated numeral 9 and is configurated as a slotted nozzle, that is a nozzle whose outlet opening is configurated as a slot. The slot is designated with reference numeral 10 (see FIG. 4) and its width, that is its transverse dimension, can be adjusted, that is it can be increased or decreased. The nozzle is constituted by a tubular elememt 11 which is slotted in longitudinal direction to form the slot 10 and which is mounted between jaws 12 and 13 having associated with them adjusting screws 14. By turning the adjusting screws 14 in requisite direction, the width of th slot 10 can be decreased, or it can be increased if the screws 14 are backed off.

Sealing elements 15 and 16 seal the element 11 with respect to its end caps 17 and 18 which in turn are mounted via screws 19 on the housing 20 which is open in the direction in which liquid is ejected from the slot 10. A bore 21 supplies the water under pressure to the tubular element 11.

When it has been pointed out above that the width of the nozzle, that is the width of the slot 10 can be adjusted, it should be understood that such adjustment is on the order of merely hundredths of a milimeter, an adjustment which can be readily achieved via the screws 14 and the jaws 12 and 13.

In the illustrated embodiment the nozzle extends over only a portion of the width of the tire 3. However, it is also possible to have the nozzle extend over the entire width of the tire 3 but in this case a very high pump capacity for the water under pressure is required.

The contour of the slot 10 can of course be so selected that advantageous flow conditions are obtained, this being a mere matter of ordinary competence and readily ascertainable by simple experimentation within the skill of those conversant with the art.

Pumps required for supplying the water with requisite pressure are known per se and do not form a part of the present invention as to their construction and operation.

It will be understood that each of the elements described above, or two or more together, may also find a useful application in other types of constructions differing from the types described above.

While the invention has been illustrated and described as embodied in an apparatus for separating rubber from embedded reinforcements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. In an apparatus for separating rubber, particularly vehicle tire rubber, from embedded reinforcements, a combination comprising at least one nozzle for ejecting a spray of high-pressure liquid against a workpiece; support means for supporting at least a portion of said workpiece opposite said nozzle during impingement of said portion by said spray so that the latter can effect separation of the rubber from the embedded reinforcements and at the same time reduce the rubber to rubber particles; collecting means for collecting the rubber particles; and moving means for effecting relative movement of said nozzle and support means.

2. A combination as defined in claim 1; and further comprising supply means for supplying liquid to said nozzle at a pressure requisite for said spray to issue from the nozzle at a speed of at least 250 m/sec.

3. A combination as defined in claim 1, said nozzle and support means being so oriented relative to one another that said spray impinges upon said portion at an angle of 90° relative thereto.

4. A combination as defined in claim 1, said nozzle having a slot-shaped discharge aperture of adjustable width.

5. In an apparatus for separating rubber, particularly vehicle tire rubber, from embedded reinforcements, a combination comprising at least one nozzle for ejecting a spray of high-pressure liquid against a workpiece, said nozzle being a tubular element having a slot-shaped discharge aperture; pressure jaws engaging said element from opposite sides so as to exert pressure and thereby adjust the width of said aperture; support means for supporting at least a portion of said workpiece opposite said nozzle for impingement of said spray so that the latter can effect separation of the rubber from the embedded reinforcements and at the same time reduce the rubber to rubber particles; collecting means for collecting the rubber particles; and moving means for effecting relative movement of said nozzle and support means.

6. In an apparatus for separating rubber, particularly vehicle tire rubber, from embedded reinforcements, a combination comprising at least one nozzle for ejecting a spray of high-pressure liquid against a workpiece, said nozzle having a first width; support means for supporting at least a portion of said workpiece opposite said nozzle for impingement of said spray so that the latter can effect separation of the rubber from the embedded reinforcements and at the same time reduce the rubber to rubber particles, said portion having a second width corresponding at most to said first width; collecting means for collecting the rubber particles; and moving means for effecting relative movement of said nozzle and support means.

7. In an apparatus for separating rubber, particularly vehicle tire rubber, from embedded reinforcements, a combination comprising at least one nozzle for ejecting a spray of high-pressure liquid against a workpiece; support means for supporting at least a portion of said workpiece opposite said nozzle for impingement of said spray so that the latter can effect separation of the rubber from the embedded reinforcements and at the same time reduce the rubber to ruber particles; collecting means for collecting the rubber particles; and moving means for effecting relative movement of said nozzle and support means, said moving means being operative for moving said nozzle over the width of said portion.

8. In an apparatus for separating rubber, particularly vehicle tire rubber, from embedded reinforcements, a combination comprising at least one nozzle for ejecting a spray of high-pressure liquid against a workpiece configured as an endless band; support means for supporting at least a portion of said workpiece opposite said nozzle for impingement of said spray so that the latter can effect separation of the rubber from the embedded reinforcements and at the same time reduce the rubber to rubber particles, said support means comprising a pair of rollers mounted for rotary movement with spacing from one another and being arranged to have said workpiece trained about them, and said pair of rollers including a driven roller; drive means for positively rotating said driven roller; tensioning means associated with one of said rollers for effecting tensioning of said workpiece via the same; collecting means for collecting the rubber particles; and moving means for effecting relative movement of said nozzle and support means.

9. A combination as defined in claim 8, said one roller being said driven roller.

10. A combination as defined in claim 8; further comprising spreading means provided on said one roller and operative for spreading the tire in direction transversely to its circumference.

* * * * *